United States Patent [19]

Chiang

[11] 4,285,801

[45] Aug. 25, 1981

[54] ELECTROPHORETIC DISPLAY COMPOSITION

[75] Inventor: Anne A. Chiang, Cupertino, Calif.

[73] Assignee: Xerox Corporation, Stamford, Conn.

[21] Appl. No.: 77,416

[22] Filed: Sep. 20, 1979

[51] Int. Cl.$^3$ .................... C25D 13/00; G02F 1/01
[52] U.S. Cl. .................... 204/299 R; 252/62.51; 252/62.53; 350/355; 350/362
[58] Field of Search ........ 204/180 R, 299 R, 299 PE, 204/181 PE, 181 R; 96/112, 1.5, 1 PE; 355/3, 3 P, 4, 5; 350/160 R, 355, 345, 362; 324/324 EC; 340/173 CH; 252/62.1, 62.51–62.54; 117/37 LE

[56] References Cited

U.S. PATENT DOCUMENTS

| | | | |
|---|---|---|---|
| 3,058,914 | 10/1962 | Metcalfe et al. | 252/62.1 |
| 3,627,682 | 12/1971 | Hall, Jr. et al. | 252/62.54 |
| 3,640,751 | 2/1972 | Kazuhiko et al. | 117/37 LE |
| 3,668,106 | 6/1972 | Ota | 204/299 |
| 4,093,534 | 6/1978 | Carter et al. | 204/299 R X |

Primary Examiner—F. Edmundson

[57] ABSTRACT

A suspension for electrophoretic display systems, such as the display systems shown in U.S. Pat. No. 3,668,106, is described. The particles in the suspension are coated with a highly fluorinated polymeric material, which acts as a dispersant. Preferably, the suspension also includes a charge control agent.

3 Claims, No Drawings

ELECTROPHORETIC DISPLAY COMPOSITION

This invention relates to an electrophoretic display composition for display systems as, for example, disclosed in U.S. Pat. No. 3,668,106 to Ota, hereafter referred to as U.S. Pat. No. 3,668,106.

In such systems, a colloidal suspension layer comprising electrophoretically active particles is placed between two electrodes, at least one of which is transparent. The particles are chosen to optically contrast with the medium; for example, the optical contrast may result from using light-reflecting versus light-absorbing materials or materials of different color. As an example where white particles are dispersed in a black fluid, the suspension will be grey until the application of an electric field. Then the particles affected by the field will electrophoretically move to one electrode giving a white appearance with the corresponding areas of the opposite electrode appearing black.

There are a number of display cell configurations disclosed in U.S. Pat. No. 3,668,106 comprising a housing, two spaced-apart electrodes and an electrophoretic suspension contained therebetween. That portion of the U.S. Pat. No. 3,668,106, including the drawing relating to cell construction, is incorporated herein by reference. The description of suspensions set out in U.S. Pat. No. 3,668,106 is also incorporated herein by reference.

The problem addressed by this invention relates to the stability of these colloidal suspensions. The instability of colloidal suspensions is well known. It is difficult to prepare suspensions that have stability against flocculation and therefore a long use life. The problem is increased further where the suspension is to be used in a display in that the suspension must also produce ample charge on the dispersed material to provide high-speed response. Conventionally, colloid stability is achieved by one of two methods as follows:

In polar media, such as water or alcohols, ionic species adsorbed on the pigment surface give rise to electrostatic repulsion between particles. The charge on the particles also causes electrophoretic activity. In non-polar media, such as aliphatic and aromatic hydrocarbons and their halogenated derivatives, a thick adsorbed layer of non-ionic polymeric dispersant on the particles provides stability through steric hindrance and other entropic factors.

Since electrophoretic devices utilize low polarity liquids, in which ionization of ordinary organic acids and salts is negligible (approximately $10^{-10}$ moles), the charge of the particle is governed by trace impurities unless otherwise controlled by adsorbing on the pigment surface some strongly ionizable or polarizable species usually referred to as charge control agents. This amount of charge, although sufficient for electrophoretic activity, may still be inadequate for electrostatic stabilization of the suspension. If the charge control agent is also polymeric, or a polymeric dispersant is present in addition, the colloid stability can be further ensured.

It is an object of this invention to provide stable suspensions for use in electrophoretic displays, the suspensions also having high electrophoretic sensitivity. These improvements are realized by adsorbing onto the surface of the suspended particles highly fluorinated organic compounds containing, preferably, chains longer than $C_8$. Specifically, highly fluorinated long-chain alkyl or alkyl aryl carboxylic acids, sulfonic acids and phosphoric acids, their esters and metal salts; highly fluorinated long-chain alkyl or alkyl aryl alcohols; highly fluorinated A-B block copolymers of long-chain alkyl or alkyl aryl alcohol with ethylene glycol or propylene glycol; and highly fluorinated poly alkyl methacrylate and its copolymers are contemplated. The ionic materials in the above group, i.e., the fluorinated acids and salts, are much more highly ionizable than their non-fluorinated counterparts due to the strong negative inductive effect of the fluorine atom. By the same inductive effect, the non-ionic material in the above group, i.e., the fluorinated esters and ethers, have highly polar $C=O$ and $C-O$ bonds, which may induce ionization of a co-adsorbed layer. These fluorinated acids, metal salts, esters and ethers therefore tend to adsorb more strongly on pigment surfaces, impart a higher surface charge density and give rise to higher electrophoretic mobility than non-fluorinated hydrocarbon counterparts, which are conventional surface active charge control agents.

As dispersants, these fluoropolymers present a thick protective layer consisting of fluorinated chains extending from the pigment or particle surface with mostly $—CF_3$ groups at the outermost surface. This thickness of the layer prevents the particles from approaching each other to within the van der Waals attraction range. The low energy autophobic nature of the $—CF_3$ surface prevents the particles from flocculating. This is a particular advantage over non-fluorinted polymeric dispersants. Surprisingly, it has been found that not only are the fluorinated polymers of this invention excellent dispersants, but they are also highly effective charge control agents. These two qualities are required in an electrophoretic display system. As discussed above, the particles in the display system must be dispersed uniformly to give a uniform appearing display and must have a long life against flocculation, otherwise it would be necessary to replace the fluid suspension often.

Another requirement of a display is that once the image is formed, it must readily be erased so that the device can undergo millions of imaging cycles. The fluorinated polymers are also surprisingly effective in facilitating complete erasure presumably by being adsorbed on the electrode, thus lowering the attraction between the electrode and the particles.

To summarize, to stabilize display colloidal suspensions, the dispersed pigments are encased firmly in fluorinated polymer shells, which polymer shells extent into the liquid sufficiently to prevent the contained pigments from approaching each other close enough to permanently coagulate. These fluorinated polymers have the additional virtue of acting either as charge control agents themselves or as preferred matrices for assisting conventional charge control agents. They also facilitate complete erasure and thus allow for prolonged operation.

To demonstrate the efficacy of the fluoropolymers of this invention, the following procedures and apparatus are utilized:

The suspensions are prepared by dispersing about 0.15 grams of finely divided pigment having a particle size of about 0.2 micron and about 0.01 gram of the dispersant and/or charge control agent to be tested in about 5 ml of liquid in a vial using ultrasonic agitation for about a minute.

The test apparatus is made as follows:

A $1'' \times 3''$ microscope slide is vacuum coated with about a 1000 Å layer of chromium. A 10-mil gap is etched photolithographically in the center, thus giving two electrodes, one on either side of the gap, which electrodes are connected to a source of DC voltage.

The test procedure is to place a drop of the suspension on the gap on the slide. A cover glass is placed over the drop and pressed down to give about a 2-mil thick suspension over the gap. A DC voltage of 200 volts is applied across the gap, the electrophoretic movement being observed under a microscope at 6× to 100×.

The following observations and interpretations are made:

Dispersion quality: "Poor" means large clumps of pigment particles, no dispersion; "fair" means aggregates of particles up to 3 mils in size; "good" means soft flocculates of primary particles about 10 micron or smaller; "excellent" is a very uniform dispersion, individual particles not distinguishable at 50× under the microscope.

Switching characteristics: Charge, %+ and %−. Only particles in the gap are considered. Polarity of particle charge is determined for particles having well-defined electrophoretic activity. Difference between 100% and (%+)+(%−) is accounted for by the chaining or adhering characteristics. Response time, which is the time required for an electrophoretic particle to traverse the gap. A response time of 0.2 second is, for example, considered quite satisfactory, being equivalent to a response time of about 16 milliseconds in a 2-mil thick real electrophoretic display device being driven by 100 volts.

Uniformity of switching layer: Y=Yes, N=No, i.e., do the particles move in a uniform layer. This is essential for achieving uniform solid area coverage.

Chaining is an undesirable characteristic wherein the particles form a chain or line of particles from electrode to electrode. It will cause non-uniform imaging in an electrophoretic display device.

Adhering to electrode: Particles previously deposited on an electrode are not removable from it by a subsequent reverse polarity voltage pulse. This will cause incomplete erasure in an electrophoretic display device.

The following tables compare in Table I non-fluorinated polymeric dispersants with their fluorinated counterparts. In Table I the suffix "A" refers to the non-fluorinated chemical while "B" refers to the fluorinated chemical in the same category, and in Table II there is shown a comparison of the effects of using various charge control agents with the preferred dispersant of this invention.

TABLE I

| No. | Pigment | Solvent | Charge Control Agent | Dispersant | Quality of Dispersion | Charge %+ | Charge %− | Response Times Sec | Uniformity of Switching Layer | Chaining | Adhering |
|---|---|---|---|---|---|---|---|---|---|---|---|
| I. | POLYOXYETHYLENE ALKYL ETHERS | | | | | | | | | | |
| IA | R-100 | Xylene | — | Brij 30 | G | — | — | — | — | Y | N |
| IA | R-100 | HCO | AOT | Brij 30 | P | 100 | — | 1 | N | Y | Y |
| IA | R-100 | Xylene | — | Brij 92 | F | — | — | — | — | Y | N |
| IA | R-100 | HCO | AOT | Brij 92 | P | 100 | — | 1.5 | — | Y | Y |
| IB | R-100 | Xylene | — | FC-176 | G | 100 | — | <0.2 | Y | N | N |
| IB | R-100 | Xylene | AOT | FC-176 | G | 100 | — | <0.2 | Y | Slight | N |
| II. | ALKYL ESTERS | | | | | | | | | | |
| IIA | R-100 | HCO | AOT | Span 20 | G | 100 | — | 1 | Y | — | — |
| IIA | R-100 | HCO | AOT | Span 60 | G | 100 | — | 1 | Y | — | — |
| IIB | R-100 | HCO | AOT | FC-432 | G | 100 | — | <0.2 | Y | — | — |
| IIB | R-100 | Freon TF | AOT | FC-432 | E | 100 | — | <0.2 | Y | — | — |
| III. | ACRYLIC POLYMERS | | | | | | | | | | |
| IIIA | R-100 | HCO | — | Elvacite 2044 | G | 100 | — | 1 | Y | — | Y |
| IIIA | R-100 | HCO | AOT | — | G | 100 | — | 1 | Y | Y | Slight |
| IIIB | R-100 | Freon TF | — | FC-721 | E | 100 | — | 0.2 | Y | — | N |
| IIIB | R-100 | HCO | AOT | FC-721 | E | 100 | — | <0.2 | Y | — | Slight |

TABLE II

| No. | Pigment | Solvent | Charge Control Agent | Dispersant | Quality of Dispersion | Charge %+ | Charge %− | Response Times Sec | Uniformity of Switching Layer | Adhering |
|---|---|---|---|---|---|---|---|---|---|---|
| I. | CARBOXYLIC ACIDS | | | | | | | | | |
| 1 | R-100 | HCO | Stearic Acid | — | F | 10 | — | — | N | Y |
| 2 | R-100 | HCO | Stearic Acid | FC-432 | G | 100 | — | 2 | Y | Y |
| 3 | R-100 | HCO | Perfluoro-octanoic Acid | — | P | 10 | — | — | N | N |
| 4 | R-100 | HCO | Perfluoro-octanoic Acid | FC-432 | G | — | 100 | 0.2 | Y | Slight |
| II | SALTS OF CARBOXYLIC ACIDS | | | | | | | | | |
| 1 | R-100 | n-BB | Na Oleate | — | P | — | — | — | N | Y |
| 2 | R-100 | n-BB | Na Oleate | FC-432 | G | 10 | 10 | — | N | Slight |
| 3 | R-100 | n-BB | Zn Stearate | — | P | 10 | 10 | — | N | Y |
| 4 | R-100 | n-BB | Zn Stearate | FC-432 | G | 10 | 10 | — | N | N |
| 5 | R-100 | n-BB | FC-128 | FC-432 | G | — | 100 | 0.2 | Y | Slight |
| 6 | R-100 | n-BB | FC-143 | FC-432 | G | — | 100 | 0.2 | Y | Slight |
| III. | SALTS OF SULFONIC ACIDS | | | | | | | | | |
| 1 | R-100 | HCO | Na Dodecane Sulfonate | FC-432 | F | 100 | — | 1 | N | Y |
| 2 | R-100 | HCO | G3300 | FC-432 | G | 100 | — | 1 | Y | Slight |
| 3 | R-100 | HCO | FC-95 | FC-432 | G | — | 100 | 0.5 | Y | N |

TABLE II-continued

| No. | Pigment | Solvent | Charge Control Agent | Dispersant | Quality of Dispersion | Charge %+ | Charge %− | Response Times Sec | Uniformity of Switching Layer | Adhering |
|---|---|---|---|---|---|---|---|---|---|---|
| 4 | R-100 | HCO | FC-98 | FC-432 | E | — | 100 | 0.2 | Y | Slight |
| IV. | SULFONATE SALTS OF DICARBOXYLIC ACID ESTERS | | | | | | | | | |
| 1 | R-100 | HCO | AAY | FC-432 | G | 100 | — | <0.2 | Y | Slight |
| 2 | R-100 | HCO | AOT | — | F | 100 | — | 0.2 | N | Y |
| 3 | R-100 | HCO | AOT | FC-432 | E | 100 | — | <0.2 | Y | N |
| V. | ADDUCTS OF POLYETHYLENE GLYCOLS AND PHOSPHATES | | | | | | | | | |
| 1 | R-100 | Xylene | Gafac RS-410 | — | G | 100 | — | <0.2 | Y | N |
| 2 | R-100 | Xylene | Gafac LO-529 | — | G | — | 100 | <0.2 | Y | Slight |

These tests have shown that in low polarity liquids, charge control agents are preferably used in conjunction with fluorinated polymeric dispersants in order to produce devices with image uniformity, clean erasure and high speed. The following examples demonstrate the use of certain preferred materials:

EXAMPLE I

An electrophoretic cell is made by separating two tin oxide coated glass electrodes by a 5-mil thick Mylar peripheral spacer, the coated surfaces facing each other. This provides a cell into which the suspension to be tested is placed. Test voltage is a ±100 V AC square wave. By dyeing the suspending fluid blue, the optical response can be measured by a photodetector as the change in reflectivity viewed through one of the $SnO_2$ glass substrates. The uniformity of image and the completeness of erasure is observed both visually and under the microscope.

About 0.05 gram of Ti-Pure R-100 pigment is mixed with 0.05 ml of Fluorad FC-721 in 1 ml of Freon TF and subjected to ultrasonic agitation for about one minute. The suspension was tested in the electrophoretic cell with the following results: Alternating white and blue images were produced at a rate of up to 5 Hz with a response time of 60 milliseconds. Both images were visually uniform. Particles were positively charged.

EXAMPLE II

The experiment of Example I is repeated using as the pigment 50 mg of Delamar Yellow. The results were alternating yellow and green images at up to 5 Hz with uniform image, positive pigment charge and response times of 100 milliseconds.

EXAMPLE III

The experiment of Example II is repeated using as the fluoropolymer 1 mg of Fluorad FC-176 and 1 ml of n-butyl benzene. The results were similar to those of Example II with response times of 120 milliseconds at 2 Hz.

EXAMPLE IV

The experiment of Example III is repeated using as the pigment 20 mg of polystyrene divinylbenzene beads, 1 micron in diameter, with the following results: Alternating light blue and dark blue uniform images with response times of 160 milliseconds were produced at 2 Hz. Pigment charge was negative.

EXAMPLE V

The experiment of Example III is repeated except that 50 mg Ti-Pure R-100 is used as the pigment, and 1 ml xylene is used as the liquid. The results were similar to those of Example I with response times of 100 ms.

EXAMPLE VI

The experiment of Example I is repeated using 3 mg Fluorad FC-432 as the fluoropolymer, 50 mg Delamar Yellow as the pigment and 1 ml n-butyl benzene as the liquid. The results were similar to those of Example II with response times of 40 milliseconds.

EXAMPLE VII

The experiment of Example VI is repeated except that 50 mg Ti-Pure R-100 is used as the pigment, and 1 ml xylene is used as the liquid. The results were similar to those of Example I with response times of 50 milliseconds.

EXAMPLE VIII

The experiment of Example I is repeated using 3 mg Fluorad FC-95 as the fluoropolymer, 50 mg Delamar Yellow as the pigment and 1 ml n-butyl benzene as the liquid. The results were similar to those of Example II, but the images were not uniform.

EXAMPLE IX

The experiment of Example VIII is repeated except that the pigment is Radiant Colors R1700-615, and the liquid is Freon TF. The results were alternating red and blue images at up to 5 Hz with response times of 60 milliseconds. Incomplete erasure occurred at switching rates below 1 Hz. Pigment charge was positive.

EXAMPLE X

The experiment of Example VIII is repeated except that the pigments are 20 mg polystyrene divinyl benzene beads 1 micron in diameter. The results were similar to those of Example IV but with positive pigment charge.

EXAMPLE XI

The experiment of Example I is repeated except that about 2 mg of Fluorad FC-432 and about 2 mg of AOT is added. The results were alternating white and blue images at up to 20 Hz and response times of 20 milliseconds with very uniform images and clean erasure. Continuous operation at 2 Hz in excess of $10^8$ cycles has not caused any image degradation.

The following table lists the trade names, suppliers and chemical names or structures for the materials used in this diclosure:

TABLE III

| Material | Supplier | Chemical Name or Structure |
|---|---|---|
| AAY | American Cyanamide | Sodium diamyl sulfosuccinate |
| AOT | American Cyanamide | Sodium dioctyl sulfosuccinate |
| Brij 92 | ICI, U.S., Inc. | Polyoxyethylene (2) lauryl ether |
| Brij 30 | ICI, U.S., Inc. | Polyoxyethylene (4) lauryl ether |
| Delamar Yellow | Du Pont | Delamar Yellow YT-717-D, an azo pigment |
| Elvacite 2044 | Du Pont | Poly n-butyl methacrylate |
| Fluorad FC-95 | 3M | Potassium perfluoroalkyl sulfonate |
| Fluorad FC-98 | 3M | Potassium perfluoroalkyl sulfonate |
| Fluorad FC-128 | 3M | Potassium fluorinated carboxylate |
| Fluorad FC-143 | 3M | Ammonium perfluoroalkyl carboxylate |
| Fluorad FC-176 | 3M | Fluorinated alkyl polyoxypropylene ether |
| Fluorad FC-432 | 3M | Fluorinated alkyl esters, molecular weight ~10K |
| Fluorad FC-721 | 3M | Poly-perfluorooctadecyl methacrylate |
| Freon TF | Du Pont | 1,1,2-thrichloro-trifluoro ethane |
| G3300 | ICI, U.S., Inc. | Alkyl aryl sulfonate |
| Gafac RS-410 | GAF | acid ester of a complex organic phosphate compound |
| Gafac LO-529 | GAF | Partial sodium salt of a complex organic phosphate ester |
| HCO | Halocarbon | Polychlorotrifluoroethylene |
| i-stearic Acid | Emery | |
| Na Oleate | J. T. Baker | |
| n-BB | J. T. Baker | n-butyl benzene |
| Perfluorooctanoic Acid | PCR | |
| PS/DVB | Duke Scientific | Polystyrene divinyl benzene beads, 1–5μ |
| R-100 | Du Pont | Ti-Pure R-100, titanium dioxide, rutile form, average size 0.2μ |
| Radiant Colors R1700-615 | Radiant Colors | Red pigmented resin, 2–5μ |
| Span 20 | ICI, U.S., Inc. | Sorbitan monostearate |
| Span 60 | ICI, U.S., Inc. | Sorbitan monostearate |
| Sodium Dodecane Sulfonate | Aldrich | |
| Xylene | J. T. Baker | |
| Zn Stearate | J. T. Baker | |

Although specific compositions and concentrations have been set out above, other suitable materials and concentration ranges may be used where desired with similar results. Such variations are intended to be included within the scope of the attached claims.

What is claimed is:

1. An electrophoretic display composition comprising particles suspended in a liquid, at least a portion of said particles being at least partially coated with a highly fluorinated polymeric material of highly fluorinated organic compounds having chains longer than $C_8$, said polymeric material being a dispersant, a charge control agent or a matrix for a charge control agent.

2. The electrophoretic display composition of claim 1 wherein said highly fluorinated long-chain alkyl or alkyl aryl carboxylic acids, sulfonic acids and phosphoric acids, their esters and metal salts; highly fluorinated long-chain alkyl or alkyl aryl alcohols; highly fluorinated A-B block copolymers of long-chain alkyl or alkyl aryl alcohol with ethylene glycol or propylene glycol; and highly fluorinated poly alkyl methacrylate and its copolymers.

3. The electrophoretic display composition of claim 1 and further including a non-polymeric charge control agent.

* * * * *

UNITED STATES PATENT AND TRADEMARK OFFICE
CERTIFICATE OF CORRECTION

PATENT NO. : 4,285,801

DATED : August 25, 1981

INVENTOR(S) : Anne A. Chiang

It is certified that error appears in the above—identified patent and that said Letters Patent is hereby corrected as shown below:

Column 8, line 32, after "said" insert -- highly fluorinated polymeric material comprises --.

Signed and Sealed this

Fifth Day of January 1982

[SEAL]

Attest:

Attesting Officer

GERALD J. MOSSINGHOFF

Commissioner of Patents and Trademarks